Dec. 29, 1936.  W. P. WHITTINGTON  2,065,778
HEATING SYSTEM CONTROL
Filed June 24, 1929  2 Sheets-Sheet 1
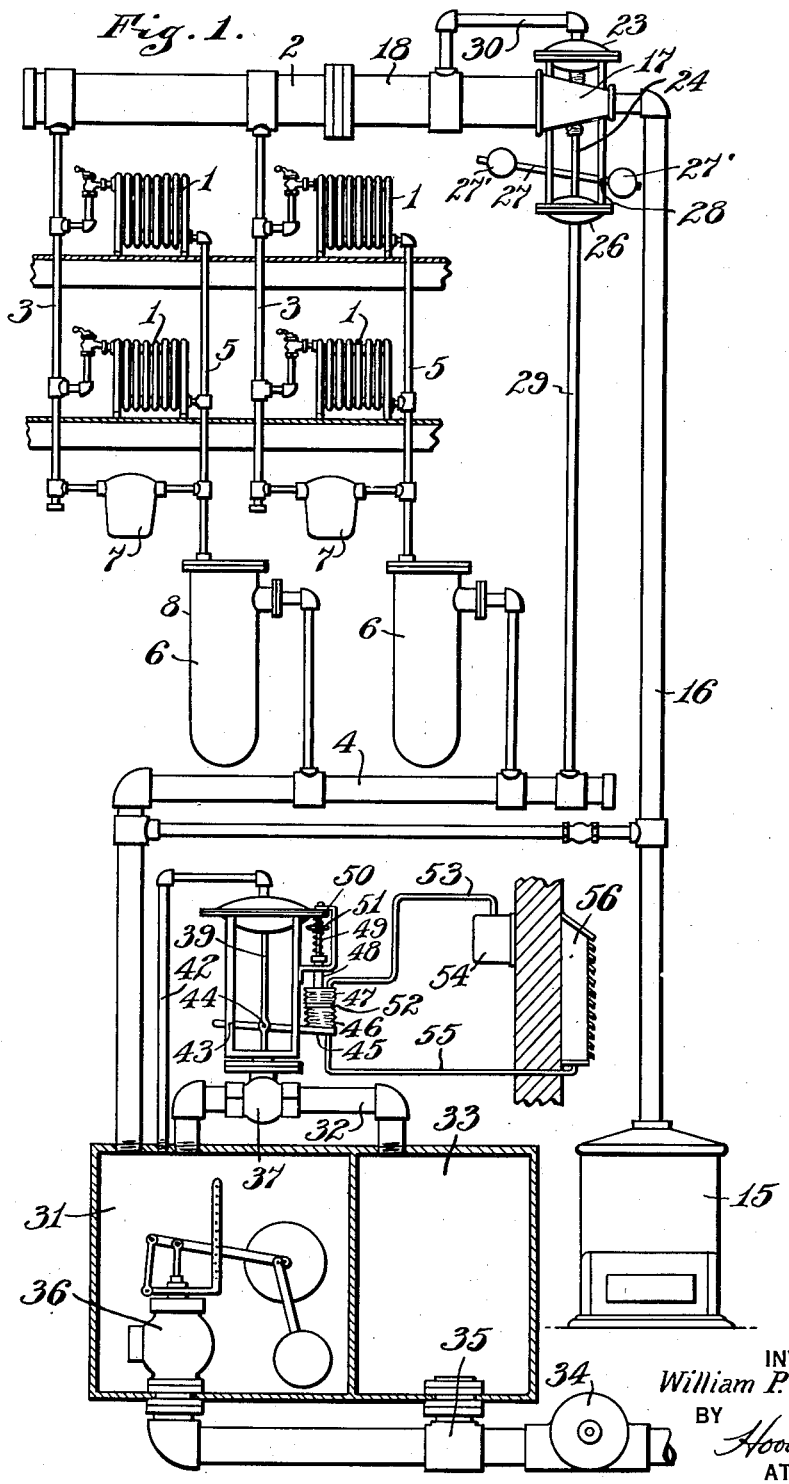
INVENTOR
William P. Whittington,
BY Hood + Hahn
ATTORNEYS Dec. 29, 1936.  W. P. WHITTINGTON  2,065,778
HEATING SYSTEM CONTROL
Filed June 24, 1929   2 Sheets-Sheet 2
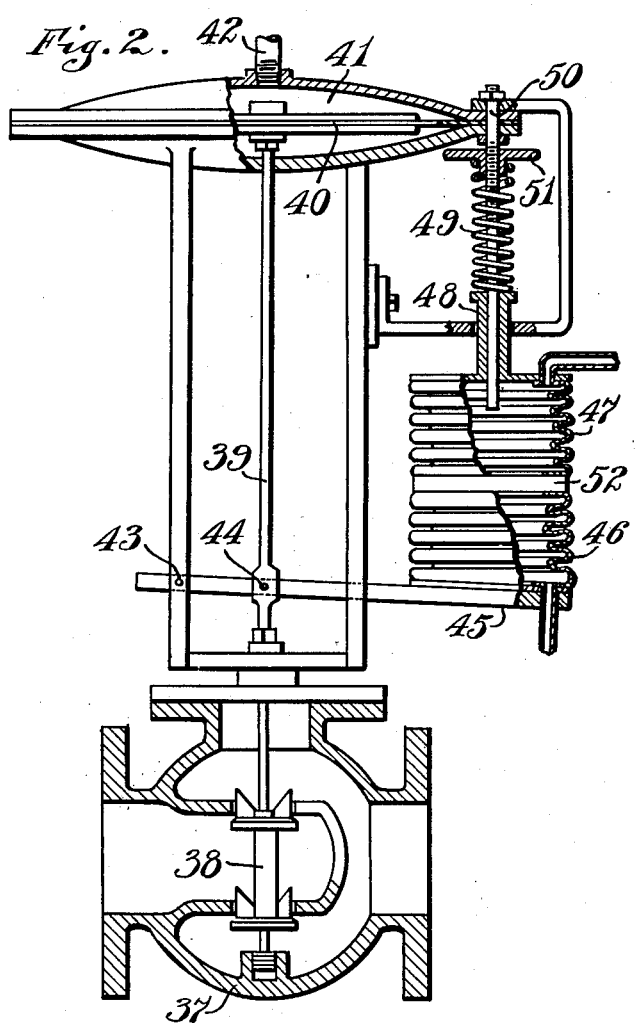
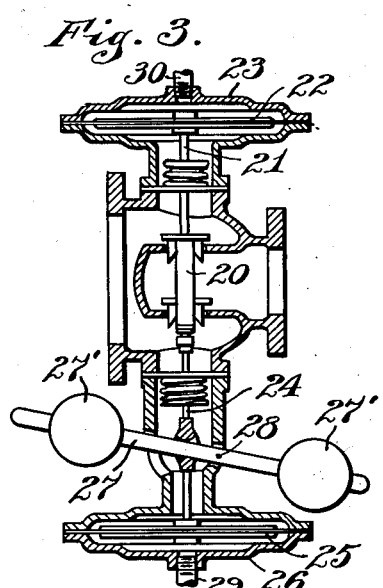
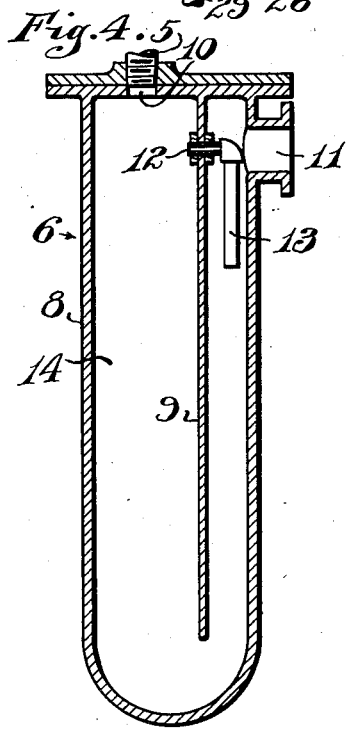
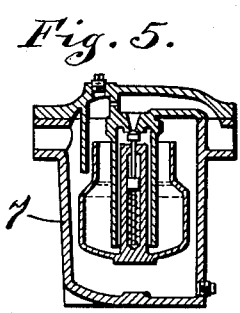
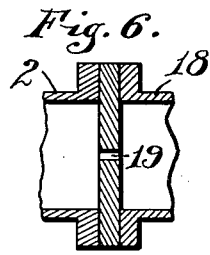
INVENTOR
William P. Whittington
BY
Hood + Hahn
ATTORNEYS Patented Dec. 29, 1936

2,065,778

UNITED STATES PATENT OFFICE 2,065,778

HEATING SYSTEM CONTROL

William P. Whittington, Indianapolis, Ind.

Application June 24, 1929, Serial No. 373,299

3 Claims. (Cl. 237—9)

My invention relates to the control of steam and vapor heating systems, having particular reference to that type of system known as the vacuum system. It is well known in the heating art that a reduction of steam or vapor pressure in the vacuum heating systems below that of atmosphere is accompanied by a relatively greater reduction in temperature and a corresponding increase in the latent heat of evaporation; and as it is the latent heat which is the useful factor in the heating function, it is obvious that an increase in the period during which the heating system is being operated below atmospheric pressure, will result in an increase in the efficiency of the system.

It is one of the objects of my invention to so control the operation of a heating system of the vacuum type that the system will be operating below atmospheric pressure practically at all times.

It is another object of my invention to operate a heating system of the vacuum type in such a manner that, in order to reduce the temperature, the system will be caused to operate under a higher vacuum or under a decreased absolute pressure and vice versa.

It is a further object of my invention to so govern the system that the pressure differential between the supply side of the system and the return side thereof will remain constant irrespective of the variations in absolute pressure produced in the operation of the system.

For the purpose of illustrating my invention I have shown a certain embodiment thereof in the accompanying drawings in which, Fig. 1 is a schematic view of a heating system embodying my invention;

Fig. 2 is a detail view, partly in section, of the means for operating the valve controlling the absolute pressure on the return side of the system;

Fig. 3 is a detail sectional view of the means controlling the admission of heating fluid to the system;

Fig. 4 is a sectional view of a differential trap used in connection with my system;

Fig. 5 is a sectional view of a steam trap used in connection with my system, and Fig. 6 is a detail sectional view showing the admission port to the supply header.

In the embodiment of the invention illustrated, the radiators 1 are connected on the supply side with a supply header 2 through the supply risers 3, and are connected on the return side with the return header 4 through the return risers 5 in which are interposed differential taps 6. Also interposed between the end of each supply riser 3 and return riser 5 is a steam trap 7 which may be of the usual construction, such as is illustrated in Fig. 5, and which maintains a pressure differential between the supply header 2 at a point beyond the radiator connections and the return header 4.

The differential trap 6 consists of a preferably cylindrical casing 8 having extending downwardly therein a baffle wall 9 terminating short of the bottom of the casing. This casing is provided at its top with an inlet 10 on one side of the baffle 9 connected with the return riser 5; and said casing is further provided with an outlet 11 on the opposite side of the baffle 9, which outlet is located adjacent the top of the casing 8 and is connected with the return header 4. An air orifice 12 is provided near the upper portion of the baffle 9 and this orifice is connected with a down-turned discharge tube 13 so that, in operation, as a water level is maintained in the casing as high as the outlet 11, the orifice is sealed at its outlet in a column of water substantially equal in length to the length of the discharge tube 13. As a result a pressure differential is thereby maintained between the chamber 14 on the inlet side of the trap and the outlet 11, sufficient to equalize the flow of heating fluid in the various return risers of the system.

Heating fluid, either steam or vapor, is supplied by the boiler 15 through the pipe 16 and through the valve 17 to the steam receiver 18 in turn connected with the supply header 2 through an orifice 19 which is calibrated to the maximum demand of the system. The valve 17 is of the balanced type and has its valve member 20 connected by a stem 21 with a diaphragm 22 operating in the diaphragm chamber 23. The valve member 20 is also connected by a stem 24 with a diaphragm 25 operating in the diaphragm chamber 26. The valve member 20 is biased toward an open position by the weighted lever 27 having weights 27', 27' thereon and pivoted at 28 to the casing. The portion of the diaphragm chamber 26 below the diaphragm 25 is connected to the return header 4 by means of a pipe 29 and the portion of the diaphragm chamber 23 above the diaphragm 22 is connected by a pipe 30 with the steam chamber 18 forming a part of the supply header 2. The upper surface of the diaphragm 25 and the lower surface of the diaphragm 22 are subjected to substantially atmospheric pressure at all times.

The return header 4 terminates in a secondary vacuum chamber 31, which in turn is connected by the pipe 32 with the primary vacuum chamber 33 in which a relatively high vacuum is maintained by a suitable vacuum pump 34 connected therewith by the pipe 35. Water of condensation escaping into the chamber 31 from the system through the return header 4 is drained from this chamber 31 through the valve 36 controlled by a float and connected by an extension of the pipe 35 with the vacuum pump 34. By this arrangement the water of condensation drops to the bottom of the tank and is drained therefrom through the pipe 35 as occasion demands, and at the same time the air is exhausted from the system through the pipe 32.

If for any reason the absolute pressure in the return header 4 decreases, a corresponding increase in the expansion of the heating fluid with which the system is filled will take place, due to the well known law that fluid will expand more rapidly in a vacuum, or partial vacuum, than under pressure and the greater the partial vacuum the greater the expansion. This increase in expansion of the heating fluid will result in a lowering of the temperature in the system and will, at the same time, tend to increase the quantity of heating fluid passing the valve 17, and as a result, the differential in the absolute pressure between the return header 4 and the supply header 2 would, in the absence of compensating means, be decreased. In order to prevent such a condition arising and to maintain the differential constant irrespective of the variation in absolute pressure in the system, a decrease in the absolute pressure in the return header 4, results in a decrease in the absolute pressure acting on the underside of the diaphragm 25 which will be actuated to cause movement of the valve member 20 towards closed position, thus cutting down the quantity of heating medium passing through the valve 17 and thereby compensating for the decrease in absolute pressure in the return header 4, thus maintaining the differential constant. Due to the fact that there is a decrease in the absolute pressure in the system, there is a relatively greater reduction in temperature in the system because, as heretofore explained, the pressure under which the heating fluid is maintained in the system has been decreased. Correspondingly, an increase in absolute pressure will increase the temperature in the system. At the same time, however, an increase in the absolute pressure in the return header 4 will cause a corresponding opening of the valve 17, thus maintaining the differential between the supply and return sides of the system constant.

The valve is caused to more quickly seek a balance by the action of the diaphragm 22, as it is obvious that a variation in the absolute pressure in the return header 4 will cause a corresponding variation in the pressure in the steam chamber 18 which, acting through the pipe 30 on the diaphragm 22, will be in opposition to the action of the diaphragm 25.

The connection of the diaphragm chamber 23 with the steam chamber 18 serves an additional function in that if, for any reason, the valve member 20 should stick in open position, the accumulated pressure in the steam receiver 18 would, acting on the diaphragm 22, move the valve to a closed position shutting off the supply of heating fluid and thereby preventing the possibility of flooding the system.

A valve 37 is interposed in the pipe 32 between the chambers 31 and 33, said valve having its valve member 38 connected by a stem 39 with a diaphragm 40 operating in the diaphragm chamber 41. That portion of said chamber 41 above the diaphragm 40 is connected by a pipe 42 with the vacuum chamber 31, while substantially atmospheric pressure is maintained in the portion of said chamber 41 below said diaphragm 42. A lever having one end pivoted at 43 to the supporting frame is connected intermediate its ends at 44 with the stem 39 and at its opposite end 45 said lever is connected to one of a pair of expansible and contractible bellows 46 and 47. The head of the bellows 46 bears on the end 45 of the lever and the opposite head of the bellows 47 is provided with an extension 48 abutting a coiled spring 49 surrounding a guiding stem 50 provided with an adjusting nut 51 against which the opposite end of the spring bears. The adjacent heads of the two bellows 46 and 47 bear against one another or against an interposed block 52. The spring 49 constantly urges the valve member 38 towards open position while the diaphragm 40 opposes the action of the spring, since the pressure exerted upon the lower face of said diaphragm exceeds that exerted upon the upper face thereof because of the connection of the upper portion of the chamber 42 with the chamber 31. By adjusting the pressure of the spring through manipulation of the nut 51 the apparatus may be set to maintain in the header 4 a definite absolute pressure under predetermined conditions. If, under the predetermined conditions, the absolute pressure in the chamber 31 and correspondingly in the header 4 tends to increase above that determined upon, this increase in absolute pressure changes the pressure differential impressed upon the diaphragm 40 and permits the spring 49 to move the valve member 38 farther towards open position, so that the air in the chamber 31 may be still further exhausted and the absolute pressure in the header 4 correspondingly decreased; likewise a decrease in the absolute pressure in the header 4 and in the chamber 31 will, by changing the pressure differential acting on the diaphragm 40, move the valve member 38 towards the closed position against the tension of the spring 49, thus reducing the rate of exhaustion of fluid from the chamber 31.

The bellows 47 is connected by a suitable conduit 53 with a thermostat member 54 mounted on the inside wall of the compartment to be heated, and the bellows 46 is connected by a similar conduit 55 with a thermostatic member 56 mounted on the exterior wall of the compartment to be heated. The thermostatic elements 54 and 56 are adapted to contain a volatile material responding to variations in the temperatures to which they are subjected, so that such variations will cause a corresponding expansion or contraction of the bellows 46 and 47.

The valve 37 is adjusted to maintain a constant predetermined absolute pressure on the return side of the system under normal conditions. It is therefore obvious that if any increase in temperature takes place in the compartment to be heated, above that which the system is adjusted to maintain, the thermostat 54 will operate to expand the bellows 47, thereby increasing the effective pressure of the spring 49 to such an extent that the valve member 38 will be moved farther toward open position, thus causing a decrease in the absolute pressure in the header 4 and a corresponding decrease in the absolute pressure in the heating system. At the same time, due to the decrease in absolute pressure in the header 4, the valve member 20 will be moved towards closed position so that the differential between the supply and return sides of the system will be maintained constant although the system will be operating under a decrease in absolute pressure. Due to this decrease in absolute pressure, there will be a corresponding decrease in temperature in the heating system and a consequent eventual lowering of temperature in the compartment to be heated. Likewise an increase in temperature of the outside atmosphere would, by causing the bellows 46 to expand, check the action of the heating system so that there would be no tendency for the heating system to cause a rise in temperature in the compartment to be heated. It is also obvious that a rise in temperature, both in the compartment to be heated, and in the outside temperature, would cause a much more rapid action as the joint action of the bellows 46 and 47 would tend to move the valve member 38 to a wider open position. A drop in temperature, either inside or outside, or both, would, of course, operate in the opposite manner.

I claim as my invention:

1. The combination of a heating unit having a supply of heating fluid thereto and a return therefrom, a valve in the return for regulating the pressure imposed upon the return, a device responsive to change of temperature at a selected location affecting the required heat output of the heating unit for exerting a variable controlling pressure increasing with increase of temperature, and means for adjusting said valve to intermediate positions dependent upon the relative values of said controlling pressure and the pressure imposed upon said return, an increase of said controlling pressure tending to open said valve and a decrease of the pressure imposed upon the return tending to close said valve.

2. The combination of a heating unit having a supply of heating fluid thereto and a return therefrom, a pump connected to the return for lowering the pressure therein, a device responsive to change of temperature at a selected location affecting the required heat output of the heating unit for exerting a variable controlling pressure increasing with increase of temperature, and a regulating valve in the return to said pump, said valve having a flexible element connected thereto responsive to increase of said pressure tending to open the valve and having a flexible element connected thereto responsive to decrease of pressure in the return tending to close said valve.

3. The combination of a heating unit having a supply of heating fluid thereto and a return therefrom, a pump connected to the return for lowering the pressure therein, a device responsive to change of temperature at a selected location affecting the required heat output of the heating unit for exerting a variable controlling pressure increasing with increase of temperature, a regulating valve in the return to said pump, said valve having a flexible element connected thereto responsive to increase of said pressure tending to open the valve and having a flexible element connected thereto responsive to decrease of pressure in the return tending to close said valve, and a trap for removing the condensate from the return, said trap being connected in the return at a location before entrance of the return to said valve.

WILLIAM P. WHITTINGTON.